(12) United States Patent
Søgaard et al.

(10) Patent No.: US 10,066,607 B2
(45) Date of Patent: Sep. 4, 2018

(54) LIGHTNING CURRENT TRANSFER SYSTEM AND WIND TURBINE USING THE LIGHTNING CURRENT TRANSFER SYSTEM

(71) Applicant: Vestas Wind Systems A/S, Aarhus N. (DK)

(72) Inventors: Morten Bagger Søgaard, Arhus N (DK); Anders Niels Hansen, Langa (DK); Claus Gron Lyngby, Braedstrup (DK); Niels Martin Henriksen, Beder (DK); Benjamin Haastrup, Aarhus N (DK); Carsten Christensen, Aarhus N. (DK); Jesper Lykkegaard Christensen, Aarhus N. (DK); Martin Ahlmann, Aarhus N. (DK)

(73) Assignee: Vestas Wind Systems A/S, Aarhus N. (DK)

( * ) Notice: Subject to any disclaimer, the term of this patent is extended or adjusted under 35 U.S.C. 154(b) by 405 days.

(21) Appl. No.: 15/027,901

(22) PCT Filed: Oct. 3, 2014

(86) PCT No.: PCT/DK2014/050311
§ 371 (c)(1),
(2) Date: Apr. 7, 2016

(87) PCT Pub. No.: WO2015/051800
PCT Pub. Date: Apr. 16, 2015

(65) Prior Publication Data
US 2016/0252078 A1  Sep. 1, 2016

(30) Foreign Application Priority Data
Oct. 7, 2013  (DK) .......................... PA 2013 70560

(51) Int. Cl.
*F01D 1/06* (2006.01)
*F03D 80/30* (2016.01)
(Continued)

(52) U.S. Cl.
CPC ............. *F03D 80/30* (2016.05); *F03D 1/065* (2013.01); *F03D 9/25* (2016.05); *Y02E 10/721* (2013.01); *Y02E 10/726* (2013.01)

(58) Field of Classification Search
CPC . H02S 10/12; F03D 9/25; F03D 80/30; F03D 3/002; F03D 1/0691; F03D 1/0675;
(Continued)

(56) References Cited

U.S. PATENT DOCUMENTS

2003/0170122 A1   9/2003  Wobben
2007/0009361 A1*  1/2007  Moller Larsen ....... H02G 13/00
                                                              416/146 R
(Continued)

FOREIGN PATENT DOCUMENTS

DE  4436197 A1  4/1996
DE  4445899 A1  6/1996
(Continued)

OTHER PUBLICATIONS

Korean Intellectual Property Office, Office Action in KR20167012042, dated Mar. 30, 2018.
(Continued)

*Primary Examiner* — Logan Kraft
*Assistant Examiner* — Justin A Pruitt
(74) *Attorney, Agent, or Firm* — Wood Herron & Evans LLP (57) ABSTRACT

The present invention relates to a lightning current transfer system (100) adapted for usage in a wind turbine (W) having a hub (20) that is rotatably supported relative to a generator in a nacelle (30) and a plurality of blades (10) that are
(Continued)

pivotably connected with the hub, wherein the hub (20) is covered by a spinner (20A). The lightning current transfer system (100) comprises a blade band (10A) mountable to the root of the blade (10); a lightning ring (80) mountable to the spinner (20A) facing the nacelle (30); a first contact device (70) mountable to the spinner (20A) adapted for providing lightning current transfer from the blade band (10A); a connecting device (75) for connecting the first contact device (70) with the lightning ring (80); and a second contact device (30B) mountable to the nacelle (30) and adapted for providing lightning current transfer from the lightning ring (80) to ground.

18 Claims, 8 Drawing Sheets

(51) Int. Cl.
*F03D 1/06* (2006.01)
*F03D 9/25* (2016.01)

(58) Field of Classification Search
CPC ........ F03D 1/0666; F03D 1/065; F03D 80/50; H01R 39/00; H01R 39/02; H01R 39/08; H01R 39/18; H01R 39/20; H01R 39/24; H02G 13/00; H02G 13/80; H02G 13/40; Y02E 10/726; Y02E 10/721
USPC ..................................................... 416/146 R
See application file for complete search history.

(56) References Cited

U.S. PATENT DOCUMENTS

| | | | | |
|---|---|---|---|---|
| 2009/0038819 A1* | 2/2009 | Molbech | ............... | H02G 13/00 |
| | | | | 174/2 |
| 2009/0284019 A1* | 11/2009 | Molbech | ................. | H01R 4/20 |
| | | | | 290/55 |

FOREIGN PATENT DOCUMENTS

| | | | |
|---|---|---|---|
| DE | 102004010104 | A1 | 9/2005 |
| EP | 1036937 | A2 | 9/2000 |
| EP | 1930586 | A1 | 6/2008 |
| EP | 2395238 | A1 | 12/2011 |
| JP | 2004225660 | A | 8/2004 |
| JP | 2006070879 | A | 3/2006 |
| JP | 2007511690 | A | 5/2007 |
| JP | 2011256871 | A | 12/2011 |
| KR | 20110135350 | A | 12/2011 |
| WO | 2010125160 | A1 | 11/2010 |
| WO | 2011131205 | A1 | 10/2011 |
| WO | 2013084374 | A1 | 6/2013 |

OTHER PUBLICATIONS

Japanese Patent Office, Notification of Reasons for Refusal in JP Appl. No. 2016-521339, dated Apr. 25, 2017.
European Patent Office, Search Report and Written Opinion issued in International Application No. PCT/DK2014/050311 dated Dec. 4, 2014.
Danish Patent and Trademark Office, Search Report issued in Application No. PA 2013 70560 dated May 23, 2014.

* cited by examiner

LIGHTNING CURRENT TRANSFER SYSTEM AND WIND TURBINE USING THE LIGHTNING CURRENT TRANSFER SYSTEM

TECHNICAL FIELD

The invention relates to a lightning current transfer system adapted for usage in a wind turbine having a hub rotatably supported relative to a generator in a nacelle of the wind turbine and a plurality of blades pivotably connected with the hub. The invention also relates to a wind turbine in which the lightning current transfer system is implemented.

DESCRIPTION OF THE RELATED ART

Due to their size, wind turbines are prone to lightning strikes. The height of wind turbines overshoots by far surrounding trees and buildings in order to efficiently convert wind power into electric energy. If lightning strikes the tip of a blade of a wind turbine, the current flows in an uncontrolled manner through the blade, the blade bearings, the hub, the hub bearings, the generator shaft, the generator and the tower into the ground. Due to the high current values, there is a high risk that the bearings and electrical generators are damaged by the high voltages and currents flowing through the bearings and the generators. Therefore, efforts have been made to avoid damages in the turbine generators and the generator shaft bearings by offering a current path with lower impedance around the sensitive areas.

For instance, JP 05/060053A suggests a lightning protection system which guides the lightning energy from the hub to the nacelle through a slip ring device so as to avoid a lightning discharge path through the shaft bearings and the generators. This slip ring device consists of a disk which is mounted at the hub and which rotates with the hub. Carbon brushes mounted at the nacelle establish an electrically conductive path between the hub and the nacelle.

This solution has, however, the disadvantage that it does not consider that in modern wind turbines, the blades are pivotably connected to the hub through bearings in order to allow blade pitch control. These bearings may also be damaged by a high current flow.

Therefore, efforts have been made in order to provide a short, low impedance connection between the root of the blade and the nacelle.

Figure 1:
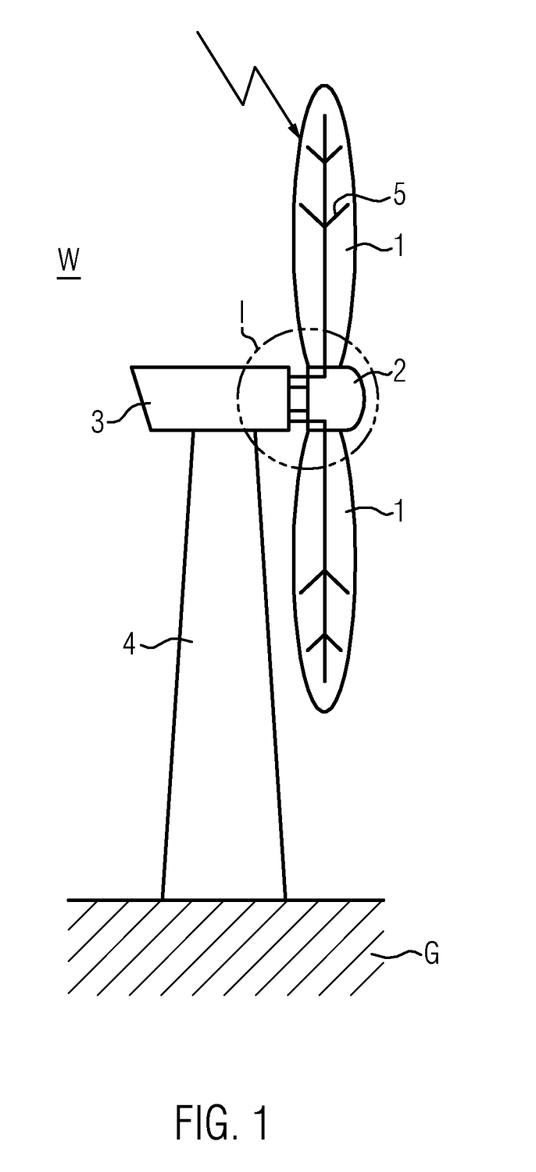
FIG. 1: Schematically a wind turbine.
Figure 2A:
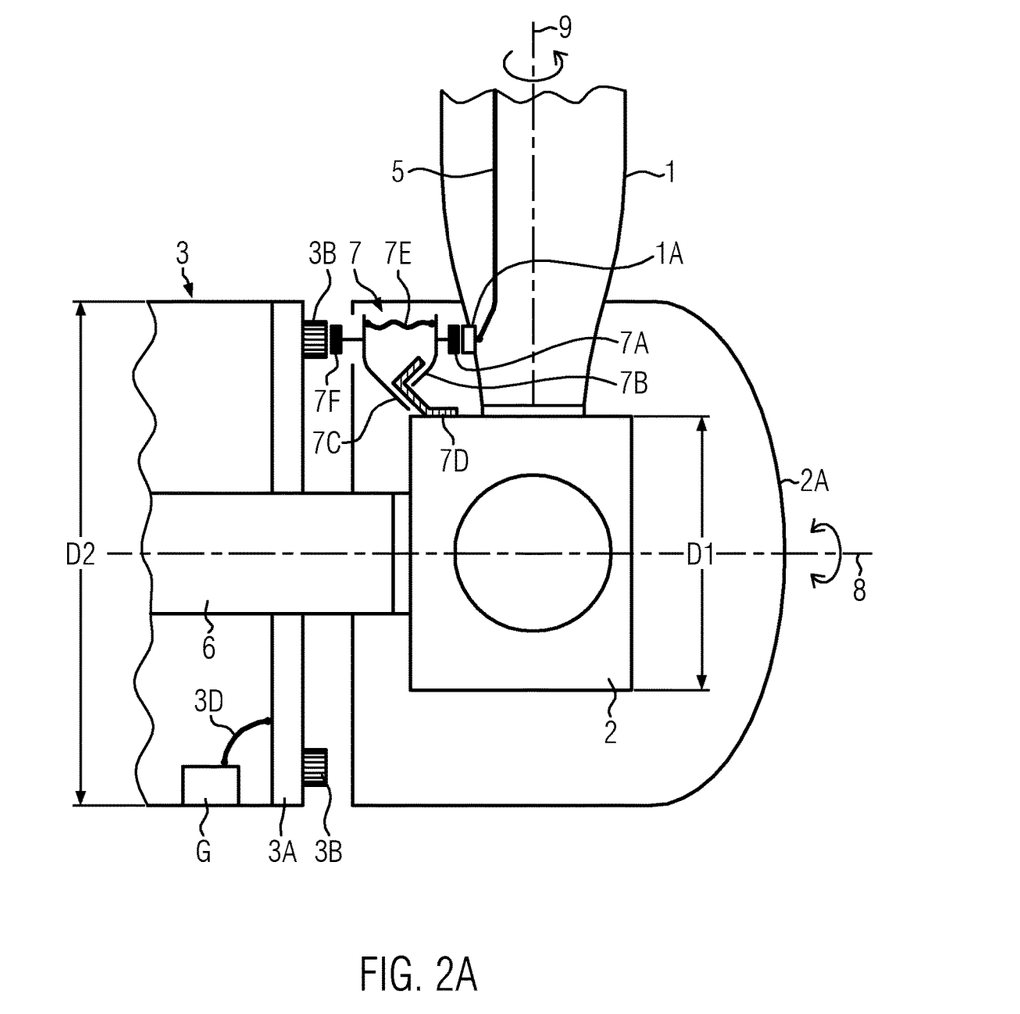
FIG. 2A: An enlarged view of the region I of FIG. 1 according to the state of the art.
Figure 2B:
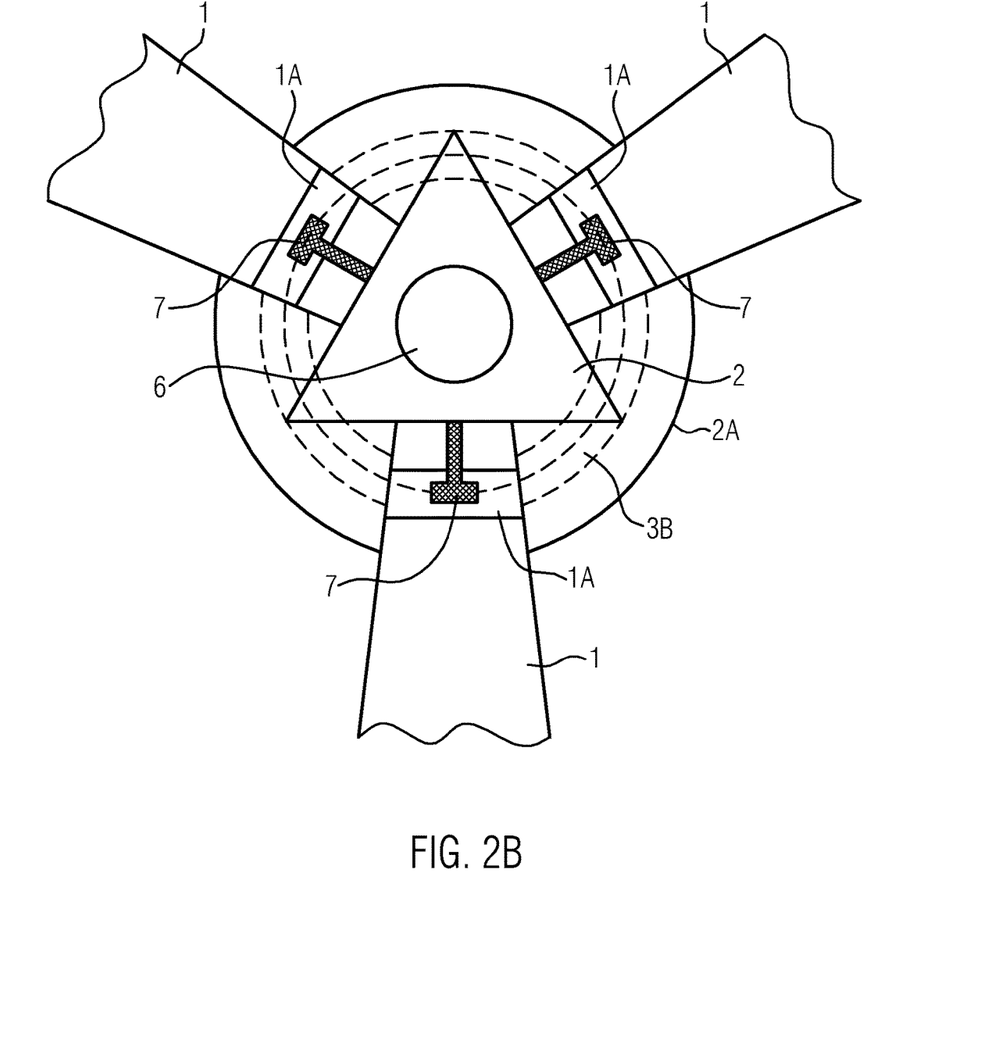
FIG. 2B: A front view of FIG. 2A.

A solution for this problem is shown in the international patent application WO 2005/050008A1 disclosing a lightning current transfer unit which is collectively usable for a wide variety of turbine types. These turbines use a lightning current transfer unit (LCTU) that provides lightning current transfer from a blade band at the blade root to a nacelle lightning ring. The hub is relatively small compared to the nacelle so that the blade band and nacelle lightning ring can be positioned in opposition to each other. This situation is illustrated in FIGS. 1 and 2. FIG. 1 shows a wind turbine W with a nacelle 3 containing the generator (not shown) sitting on the wind turbine tower 4. The blades 1 supported by the hub 2 are connected through a generator shaft with the turbine generators in the nacelle 3. Within the blade 1, a blade lightning protection system 5 is provided in the form of a down conductor with thick conductive cables guiding the lightning power through the blades to the root of the blades 1. From there, the lightning current is transferred via the hub 2, the nacelle 3, and the tower 4 into ground G.

FIGS. 2A and 2B show a more detailed view of the encircled section I in FIG. 1. In FIG. 2A, reference numeral 1 designates a blade, numeral 2 designates the hub, numeral 2A designates the spinner (the cover/housing of the hub), numeral 3 designates the nacelle, numeral 3A designates the front plate of the nacelle and reference numeral 6 designates the generator shaft which connects the hub 2 with the generator (not shown) in the nacelle 3. The lightning current transfer unit comprises a blade band 1A that is mounted at the root of the blade 1 and which is connected with the cables of the blade lightning protection system 5. Moreover, the LCTU comprises a lightning ring 3B which is mounted at the nacelle front plate 3A. The hub 2 is relatively small compared to the nacelle 3 so that the blade band 1A and the nacelle lightning ring 3B are positioned to face each other. That is, the diameter D1 of the hub 2 is smaller than the diameter D2 of the nacelle 3 so that the blade band 1A can rotate inside of the nacelle perimeter dimensions D2. This dimensional relationship allows the positioning of a compact connecting device 7 which electrically connects the blade band 1A which is rotatable around a blade axis 9, and the nacelle lightning ring 3B which rotates relative to the connecting device 7 around the hub axis 8. The hub 2 and the connecting device 7 are collectively enclosed by a fibre glass cover to which it is referred as the spinner 2A.

The connecting device 7 in FIG. 2A comprises a bracket 7D, to which one end of two fibre glass profiles 7B and 7C are mounted. At the other ends of the fibre glass profiles 7B and 7C, contact elements 7A and 7F are mounted respectively. A cable 7E connects the contact elements 7A and 7F. It has to be noted that FIG. 2A shows a small gap between contact elements 7A/7F and blade band 1A and lightning ring 3B, respectively, for illustration purposes. In operation, these contacts are sliding contacts. Bending forces of the fibre glass profiles 7B and 7C push the contact elements 7A and 7F against the blade band 1A and the lightning ring 3B to ensure a low impedance connection between the blade 1 and the nacelle 3 even if contact element 7F is rotating relative to the lightning ring 3B around axis 8 and the blade band 1A is rotating relative to the contact 7A around axis 9. When lightning strikes a blade 1, the lightning current is guided through the cable 5 of the blade lightning protection system to the blade band 1A, through the contact 7A, the connection cable 7E, the contact element 7F to the lightning ring 3B which is mounted to the nacelle front plate 3A which is grounded through a cable 3D with ground G.

A detailed view of the connecting device 7 is given in FIG. 3 which again shows the mounting bracket 7D, the glass fibre profiles 7C and 7B, the contact elements 7A and 7F and the cable 7E that electrically connects the contact elements 7A and 7F. Due to the elasticity and a pretension, the contact elements 7A and 7F are forced against the blade band and the lightning ring, to establish a point of low impedance between the blade band 1A and the lightning ring 3B.

FIG. 2B shows a front view of FIG. 2A along axis 8 and illustrates the arrangement of the connecting devices 7 with regard to three blades 1. Each blade 1 is provided with a blade band 1A and each blade band is contacted with a respective connecting device 7 so that three connecting devices are necessary. Each connecting device 7 is also in contact with the lightning ring 3B illustrated in FIG. 2B as a dashed line. The contour of the lightning ring 3B is within the perimeter of the spinner 2A.

Figure 3:
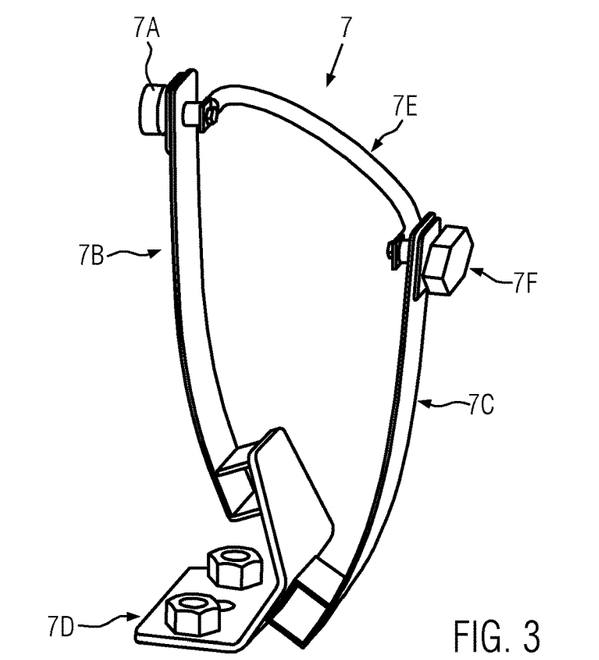
FIG. 3: A connection part of the lightning current transfer system according to the state of the art.
Figure 4:
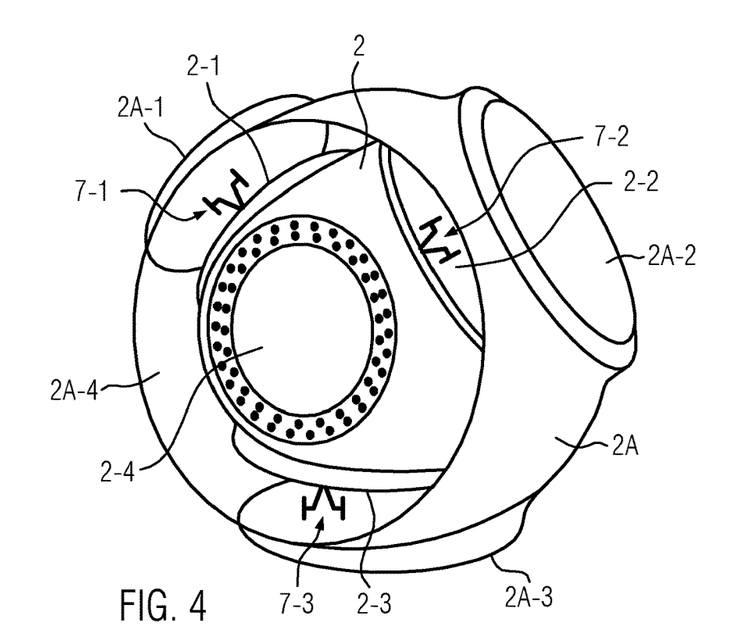
FIG. 4: A schematic 3-dimensional view of a hub and a spinner according to the state of the art.

A simplified 3-dimensional illustration of the hub 2 and the spinner 2A is shown in FIG. 4. The spinner 2A has four openings, wherein the openings 2A-1, 2A-2 and 2A-3 are intended for feeding through the three blades and the fourth opening 2A-4 is used to allow a connection of the hub 2 with the generator shaft 6. The hub 2 includes four flanges 2-1, 2-2, 2-3 and 2-4 wherein the flanges 2-1, 2-2 and 2-3 are intended to mount a respective blade and flange 2-4 is intended to mount the generator shaft. Reference numerals 7-1, 7-2 and 7-3 symbolize three connecting devices as illustrated in FIG. 3. The spinner opening 2A-4 is larger than the other openings in order to allow a connection of the connecting devices 7-1, 7-2 and 7-3 with the lightning ring at the nacelle through opening 2A-4. FIG. 4 illustrates three connecting devices 7-1, 7-2 and 7-3, one for each blade 1.

In recent times, there is a growing demand for larger wind turbines with pitch controllable blades, which leads to a larger hub so that finally, the blade band rotates outside of the nacelle perimeter. This has two consequences. At first, the v-shape of the contact element 7 is no longer possible because it is not possible to place the blade band 1A opposite to the lightning ring 3B. Second, this also leads to an increased length of the connecting cable leading to higher impedance. A consequence of this is that the distance of the lightning protection system to sensitive parts like bearings and generators has to be increased in order to avoid discharges into the bearings and the generator.

It is therefore an object of this invention to provide a lightning current transfer system for large wind turbines which can use most of the parts of the lightning current transfer system of smaller wind turbines and which is maintainable in situ.

SUMMARY OF INVENTION

The object is achieved by a lightning current transfer system as claimed in claim 1.

More particularly, the object is achieved by a lightning current transfer system that is adapted for usage in a wind turbine having a hub rotatably supported relative to a generator in a nacelle and a plurality of blades pivotably connected with the hub, wherein the hub is covered by a spinner. The lightning current transfer system comprises a blade band which is mountable to the root of the blade, a lightning ring which is mountable to the spinner facing the nacelle, a first contact device which is mountable to the spinner and which is adapted for providing lightning current transfer from the blade band, a connecting device for connecting the contact device with the lightning ring, and a second contact device that is mountable to the nacelle and which is adapted for providing lightning current transfer from the lightning ring to ground.

This arrangement has the advantage that the lightning current transfer system can be used for larger wind turbines with larger hubs wherein the blade band rotates outside of the nacelle perimeter. Moreover, this lightning current transfer system can be designed so that many of the parts of the lightning current transfer system for smaller wind turbines can be used and implemented for larger wind turbines in a new assembly. The lightning current transfer system of the present invention basically splits the integral connecting device of the state-of-the-art as described with reference to FIG. 3 into two separate contact devices which also allow an increase of the respect distance (separation distance) to sensitive parts like bearings and generator parts. Another advantage is that the lightning ring can be mounted to the spinner and the second contact device are mountable to the nacelle which means that a plurality of second contact devices can be used on the nacelle side so that lightning current can be distributed over several contact points which reduces the current magnitude in one contact so that wear can also be reduced. This also adds redundancy and safety to the nacelle side lightning current transfer system in comparison to the prior art according to FIGS. 2-4. In the case that lightning strikes a wind turbine with a lightning current transfer system according to the state of the art, current flows only through one contact point into the nacelle and increases therefore load and wear of the contact device in a lightning current transfer system of the prior art.

In one embodiment, the blade band and the first contact device are configured to be mounted outside the spinner and the connecting device for connecting the first contact device with the lightning ring is configured to be mounted inside the spinner.

This configuration allows on one hand larger respect distances (separation distances) between the first contact device/connecting device and bearings or other sensitive parts. On the other hand, connecting cables (connecting device) between the first contact device and the lightning ring can be made shorter so as to reduce the impedance between these points.

In another embodiment, the first contact device of the lightning current transfer system comprises a first mounting element mountable to the spinner, a first elastic non-conducting profile mounted to the first mounting element and a first contact element mounted at the first elastic non-conducting profile, wherein the first contact device is configured so that the first contact element faces the blade band and the first elastic non-conducting profile pushes the first contact element against the blade band.

This embodiment has the advantage that the first contact element and the first elastic non-conducting profile of well-established preexisting lightning current transfer system like that illustrated in FIGS. 2*a* and 3 can be reused. The first mounting element is designed to serve as a combination of a bracket (fixture for the first elastic non-conducting profile) and a cover which protects the first contact device against the environment because the first mounting element is mounted outside the spinner.

According to a further embodiment, the first contact element comprises a conductive rod and a sliding element, wherein the conductive rod extends through a hole of the sliding element so that an end surface of the conductive rod and a surface of the sliding element collectively form a contact area for slidingly contacting the blade band. Thus, an electrical contact with small friction forces with the blade band can be established. Moreover, contact elements of established lightning current transfer units can be implemented in this invention, saving manufacturing costs.

In order to reduce the frictional forces of the sliding contact, the sliding element may be provided with a chamfered edge. This also improves ice sliding ability in case that icing occurs. The sliding area of the sliding element may have the shape of a hexagon with an edge of the hexagon in a moving direction of the sliding element so as to reduce friction in a sliding direction, in particular in case of a contaminated blade band surface.

In order to reduce friction and wear of the sliding element, the sliding element may be made of Nylatron.

In one embodiment, the second contact device comprises a second mounting element one end thereof being mountable to a front plate of the nacelle so that the second mounting element protrudes therefrom, a second elastic non-conducting profile mounted at one end to another end of the second mounting element, an extension bracket mounted at the second elastic non-conducting profile, and a second contact element mounted at the extension bracket, wherein the second contact device is configured so that the contact element may extend through a hole in a nacelle front cover so as to face the lightning ring mounted at the spinner, and the second elastic non-conducting profile pushes the second contact element against the lightning ring.

In this embodiment, the second contact device, the elastic non-conducting profile and the second contact element of existing well-established lightning current transfer units can be used. Moreover, the first elastic non-conducting profile may have the same structure as the second elastic non-conducting profile and the first contact element may have the same structure as the second contact element so that the respective elements are interchangeable on one hand and can also be used for older well-established lightning current transfer systems like that illustrated in FIGS. 2a and 3. Moreover, the structure of the second contact device is configured to be mounted inside of the nacelle cover so that the second contact element can protrude through a small hole in the nacelle front cover to establish an electric contact with the lightning ring at the spinner. Moreover, bending forces of the pre-tensed second elastic non-conducting profile ensure that the contact element is pressed against the lightning ring for making a low impedance contact.

In order to add redundancy and to decrease the lightning current through each second contact, at least two second contact devices and more preferably, four second contact devices are used in a nacelle.

In one embodiment, the first mounting element comprises a fibre glass console acting as a fastening bracket for the first elastic non-conducting profile and a cover for protection of the first contact element. As the first contact device is mounted outside the spinner, the contact element is exposed to environment influences. The construction of the first contact device allows a protection of the contact element from environmental conditions.

In another embodiment, the second mounting element is a stainless steel bracket bridging the distance between the mechanically robust nacelle front plate and the nacelle front cover. Thus, the bracket can also be used as a tread for service personnel.

In a further embodiment, the first elastic non-conducting profile and a second elastic non-conducting profile are fibre glass profiles. Fibre glass is a very robust, elastic and non-conductive material which can provide and transmit bending forces so as to establish a safe electrical contact between the contact elements on one side and the blade band and/or the lightning ring on the other side.

In another aspect of this invention, a wind turbine is provided which comprises a hub that rotatably supported relative to a generator in a nacelle, a plurality of blades that are pivotably connected with the hub and a lightning current transfer system for transferring lightning current from the blade to the nacelle, as outlined above.

In one embodiment thereof, the nacelle includes an inspection hatch in the nacelle front plate cover for inspecting the lightning ring. Thus, service can be provided in-situ.

SHORT DESCRIPTION OF THE FIGURES

In the following, embodiments, examples, advantages and implementations of the invention will be explained in more detail by means of the accompanying figures. It is noted that all described and/or illustrated features alone or in arbitrary combination are basically subject matter of the invention, independently of the summary in the claims or the references in the claim. Also, the content of the claims is considered to be part of the description. In the figures show

DETAILED DESCRIPTION OF EMBODIMENTS

This invention has been made in order to provide a lightning current transfer system which can be used for wind turbines which are larger than the previous wind turbine constructions. In such larger wind turbines, the blades and the hub are increased in size so that the part of the lightning current transfer unit which is responsible for collecting the lightning current from the root of the blade rotates with the hub beyond the perimeter of the nacelle. Moreover, this invention has been made in order to allow at least partially the usage of lightning current transfer units according to the state-of-the-art. Moreover, all parts of the lightning current transfer unit of this invention shall be exchangeable in-situ and shall also reduce wear due to the lightning current.

Figure 5:
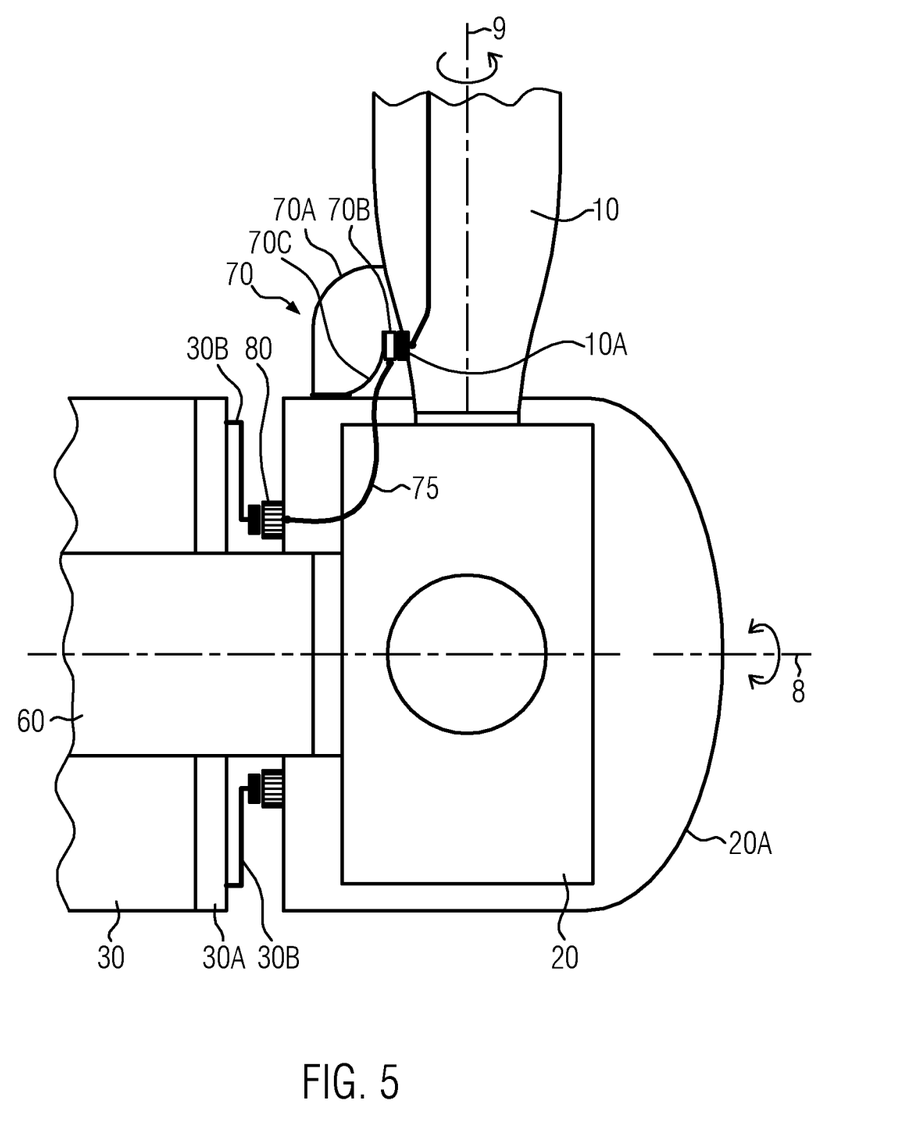
FIG. 5: A schematical drawing of a lightning current transfer system according to the present invention mounted at a nacelle and a spinner.

FIG. 5 gives an overview of the lightning current transfer system according to the present invention. In FIG. 5, reference numeral 20 designates a hub, reference numeral 10 designates a blade, reference numeral 60 designates a shaft which connects the hub 20 with a generator (not shown) within the nacelle 30, and reference numeral 20A designates a spinner (aerodynamic housing of the hub 20). FIG. 5 illustrates that the hub 20 is directly connected with the shaft 60 which in turn may be directly connected with the generator so as to implement a direct drive system. This invention is, however not restricted to such configurations. It is also possible to interpose a gearbox between the hub and the generator to convert a low speed rotational movement of the hub into a high speed rotational movement of a high speed shaft that drives the generator. The gearbox may be directly mounted to the hub or may be interposed between a low speed shaft from the hub and a high speed shaft from the generator. Therefore, in more general terms, the hub is rotatably supported relative to the generator.

The lightning current transfer system includes the blade band 10A, the lightning ring 80, the blade part contact device 70 (also referred to as a first contact device 70) and nacelle side contact device 30B (also referred to as a second contact device 30B). Blade part contact device 70 includes the blade part sliding contact 70B (also referred to as first contact element 70B), a nonconductive elastic glass fibre arm 70C (also referred to as first non-conductive elastic glass fibre profile 70C) and a first mounting element 70A which fixes the glass fibre profile 70C to the spinner 20A and protects at the same time the sliding contact 70B that is mounted at the glass fibre arm 70C against environment. An electrical connection 75 inside the spinner 20A connects the sliding contact 70B with the lightning ring 80 which is mounted at the back side of the spinner 20A so as to face sliding contacts (also referred to as second contact element)

of the nacelle contact device 30B (second contact device 30B). Rotation axes 8 and 9 indicate the same rotating capabilities of the spinner/hub and the blade are as described in FIG. 2A.

In general, the same reference numerals designate the same technical features in the figures and an omitted description of a particular reference number may be found in a description of a previous figure. Moreover, the dimensions and proportions in the figures have only illustrative character and are not intended to reflect a scale model. It is further noted that FIG. 5 shows a small gap between contact elements 70B/30B and blade band 10A and lightning ring 80, respectively, for illustrative purposes. In operation, these contacts are sliding contacts and no gaps are visible.

It has to be noted that the lightning current transfer system according to this specification is exemplarily illustrated in form of sliding contacts that provide a low impedance connection. Thereby, the term "low impedance" is intended to describe an impedance for a lightning current transfer path that is lower than alternative lightning current transfer paths, so that the lightning current transfer can be controlled. In particular embodiments of this invention, the low impedance connection is provided with sliding contacts. This invention is, however, not restricted to sliding contacts. Moreover, the low impedance contacts may also be implemented as a spark gap—that is the electrical connection between the blade band 10A and the first contact element may a spark gap and/or the electrical connection between the lightning ring 80 and the second contact device 30B may be a spark gap, rather than sliding contacts. In summary, a contact for a lightning current transfer has to be distinguished from a low energy (low voltage) electrical contact. The claimed contacts for lightning current transfer have to be electrically conductive for potential differences above several thousand volts due to the high voltages of lightning. Nevertheless, some embodiments also use contacts which are conductive at lower voltages (potential differences). Another implicit requirement of the claimed contacts is that their material can withstand very high current flow of up to several hundred thousand amperes.

The nacelle side contact device 30B is mounted to front plate 30A of the nacelle 30.

If a lightning strikes the blade 10, the lightning current is guided through cables within the blade 10 to a blade band 10A. The elastic glass fibre arm 70C presses the sliding contact 70B against the blade band 10A so as to ensure a conductive connection even if the blade 10 is pivoting/pitching around the axis 9. The lightning current is further guided through the cable 75 to the lightning ring 80 which is mounted on the nacelle side of the spinner 20A. The nacelle contact device 30B also includes a sliding contact element which guides the lightning current from the lightning ring 80 to the grounded front plate 30A of the nacelle 30. The routing of the lightning current through the cables of the blade, the spinner and the nacelle to the ground inherently includes a voltage drop along the cable. The larger the wind turbine, the higher is the risk that the current jumps from the desired current path to unwanted structural elements and continues through the shaft and main bearings. In order to prevent the current to jump from the desired current path to unwanted structural elements, a minimum respect distance needs to be kept to these structural elements. The larger the wind turbine, the larger these respect distances have to be. The positioning of the blade side contact device 70 outside of the spinner increases the respect distance so that the required respect distance can be fulfilled.

Figure 6:
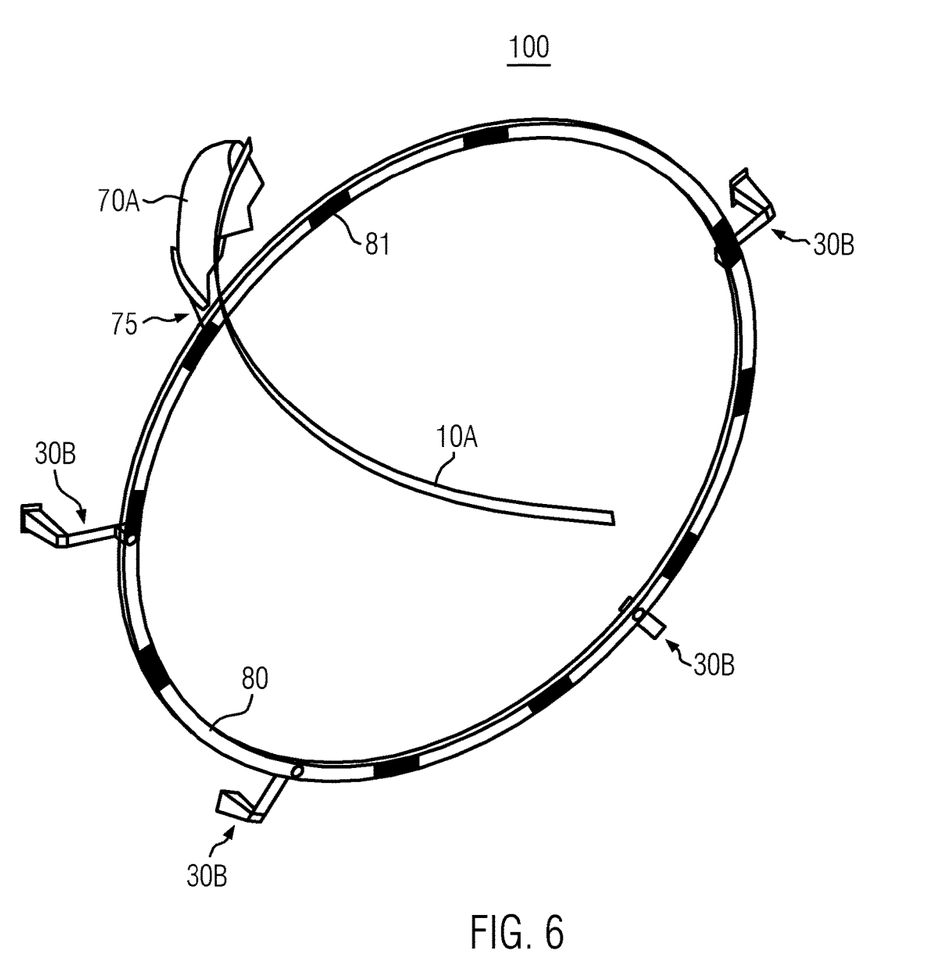
FIG. 6: A 3-dimensional view of an isolated lightning current transfer unit according to the present invention.

FIG. 6 shows the isolated lightning current transfer system 100 according to the present invention. FIG. 6 shows the lightning ring 80 that is mounted via lightning ring brackets 81 to the spinner (not shown in FIG. 6). The lightning ring 80 may be composed of several stainless steel segments which are fixed together with the lightning ring brackets 81. FIG. 6 shows 10 lightning ring segments and ten lightning ring brackets 81. This number is, however, only used for illustrative purposes. Less than 10 stainless steel segments are possible and also more than 10 stainless steel segments are possible. Preferably, twelve stainless steel segments are used which leads to a manageable size of the segments which can be comfortably handled for in-situ maintenance from the nacelle, for instance, if a lightning ring segment has to be changed due to wear.

FIG. 6 also shows the blade band 10A which is a stainless steel plate, for instance, having a size of 4,000×80×3 mm. The stainless steel plate may be bolted and glued onto each blade. Attachment holes are positioned at each end of the blade band 10A. Further two holes may be positioned in an intermediate region of the blade band in order to fit the plate to the blade. The intermediate holes also serve as attachment points for the current transferring cable that run inside each blade. Since two contact points may be implemented in the blade band 10A, the lightning current is divided if the blade pitch angle causes the contact element in the first mounting element 70A to be positioned between the two intermediate holes. Dividing the current reduces the needed respect distance and reduces also the wear of the blade band 10A.

Moreover, FIG. 6 shows four nacelle contact device 30B (second contact device 30B) that are in sliding contact with the lightning ring 80. The blade side contact element inside the composite console 70A is connected with the lightning ring 80 via cable 75.

Figure 7:
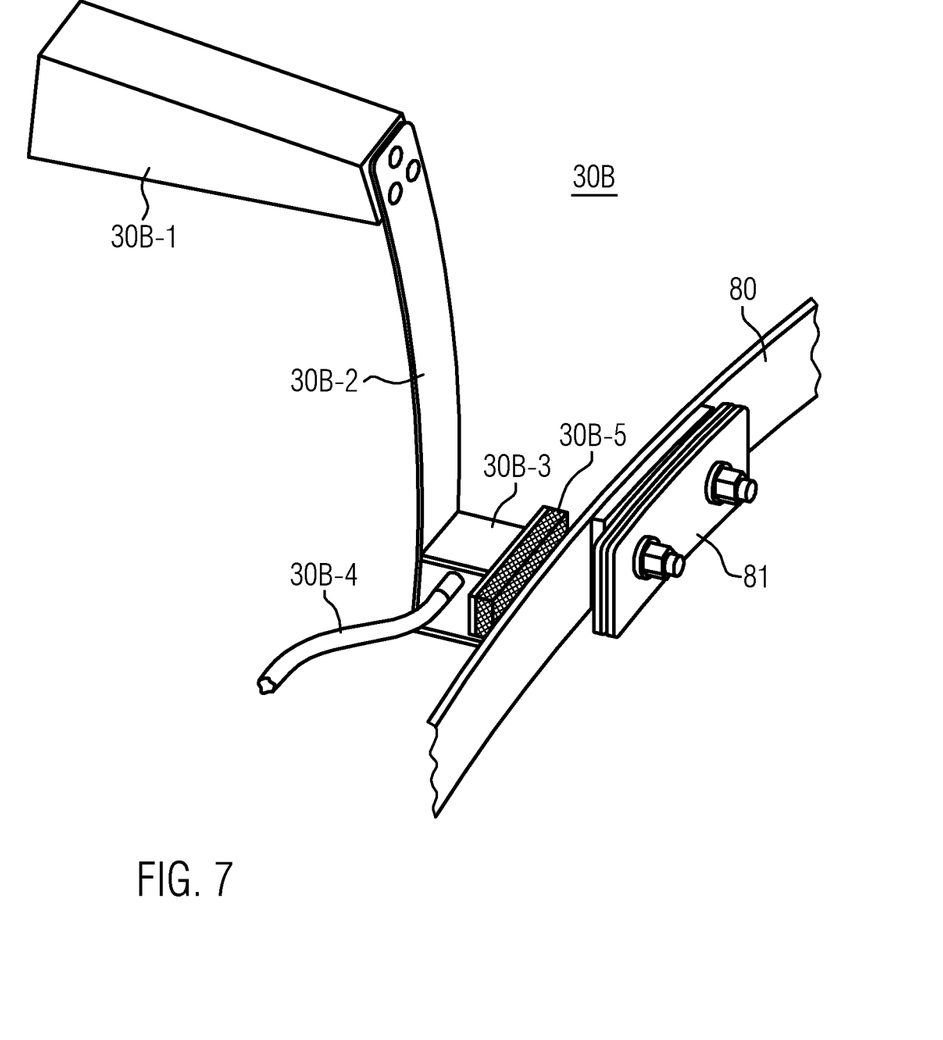
FIG. 7: A 3-dimensional view of a second contact device according to the present invention.

The nacelle side contact device 30B (second contact device 30B) is shown in more detail in FIG. 7. FIG. 7 shows a bracket 30B-1, a fibre glass profile 30B-2, an extension bracket 30B-3, and a contact element 30B-5, which is intended for slidingly contact with the lightning ring 80 which is mounted via bracket 81 to the spinner. The contact element 30B-5 is grounded to a cable 30B-4 which is grounded to the nacelle main structure.

The bracket 30B-1 fixes the fibre glass profile 30B-2 to the nacelle front plate and bridges the distance between the grounded nacelle front plate and the nacelle front cover (not illustrated). One end of the fibre glass profile 30B-2 is fixed to the bracket 30B-1 and at the other end of the fibre glass profile 30B-2, the extension bracket 30B-3 is mounted, which bridges a certain distance through the nacelle front cover (not shown) to the lightning ring 80. The contact element 30B-5 is mounted to the extension bracket 30B-3 so that it is located outside the nacelle in front of the lightning ring 80. The nacelle side contact device 30B is configured so that the fibre glass profile 30B-2 can be provided with pretension so that the contact element 30B-5 is pressed against the lightning ring 80.

Figure 8:
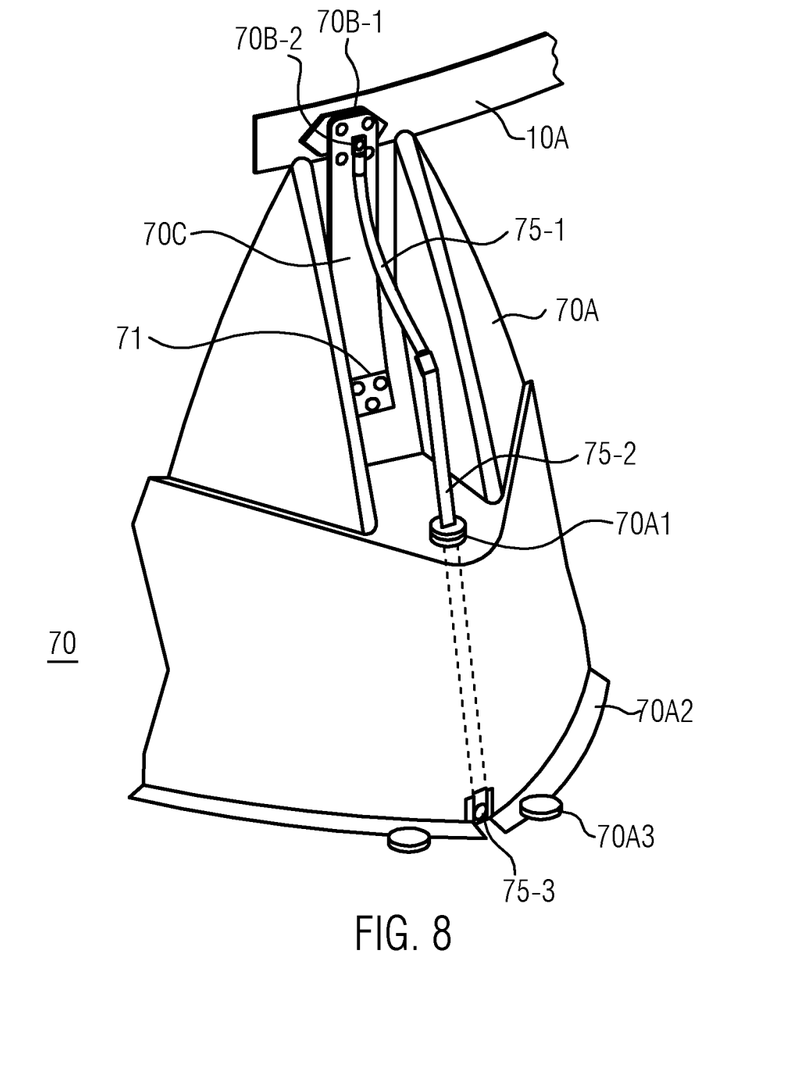
FIG. 8: A 3-dimensional view of the first contact device of the present invention.

The contact element 30B-5 may be designed in accordance with the international patent application WO 2005/05008, for instance, illustrated in FIG. 8 thereof. The contact element 30B-5 basically may comprise a contact rod extending through a sliding pad. The rod preferably makes the electric contact to the rotating lightning ring 80 and the pad surrounding the rod ensures a low friction slide on the contact surface. The contact rod may be fixed to extension bracket 30B-3 by screwing a bolt into a threaded hole in the back side of the contact rod. In this description, to the combination of the contact rod and the sliding pad, it is collectively referred to as the contact element. The nacelle side contact element 30B-5 (second contact element 30B-5) and the spinner side contact element 70B (first contact element 70B, see FIG. 5 or 8) may have the same structure or may be different. For instance, FIG. 3 showing the lightning current transfer unit according to the state-of-the-art shows two different shapes of contact elements. Contact element 7A making the contact with the blade band 1A is a circular disk. The contact element 7F making the contact with the lightning ring 3B has a hexagonal structure with edges in a relative moving direction. Similarly, the contact element 30B-5 in FIG. 7 may have a disk form or a hexagonal form.

The contact rod may be made from an electric conductive material such as copper, aluminum, bronze, graphite, silver or composites thereof. Preferably, bronze is used.

The pad may be made of a low friction material such as nylon, acetal, Vesconite or glass filled nylon. Preferably, Nylatron is used for the sliding pad. In order to improve the sliding properties and adaptability to ice layers on the lightning ring 80, the contact element 30B-5 may be provided with a chamfered edge.

FIG. 8 shows a detailed view of the spinner side contact device 70 (first contact device 70) for providing contact with the blade band 10A. The spinner side contact device 70 comprises a (first) mounting element 70A to which a fibre glass profile 70C is mounted via a bracket 71. A contact element 70B-1 is mounted with a threaded bolt 70B-2 to the fibre glass profile 70C. A cable 75-1 is electrically connected with the bolt 70B-2 in order to make an electrical connection with the contact element 70B-1. The cable 75-1 is electrically connected with a lightning current transfer profile 75-2, which electrically connects the cable 75-1 with the connection bus 75-3. The lightning current transfer profile 75-2 is fixed to the fibre glass console 70 with a rubber fixture 70A1. The connection bus 75-3 connects the lightning current transfer profile 75-2 with the lightning ring 80 which is mounted to the spinner in front of the nacelle. To the cable 75-1, the lightning current transfer profile 75-2 and the connection bus 75-3, it is collectively referred to as the connecting device 75, for instance, in FIGS. 5 and 6. To the blade side contact element including the contact element 70B-1 and the bolt 70B-2, it is collectively referred to as the first contact element 70B (see for instance FIG. 5). The structure of the first contact element 70B may be the same as the nacelle side contact element 30B-5 as explained with FIG. 7.

The first mounting element fibre glass console 70A is fixed to the spinner at each blade to support the contact with the respective blade band 10A by means of threaded washers 70A3. The exposed part of the cable 75-1, the lightning current transfer profile 75-2 and the fibre glass profile 70C may be protected from environment by a cover (not shown in FIG. 8, indicated in FIG. 6). The first mounting element fibre glass console 70A comprises a fibre glass console used as a mounting bracket and a cover protecting the contact elements.

The fibre glass console may be 8 mm thick and acts as a fastening bracket for the fibre glass profile 70C. It may be bolted onto the hub cover (spinner) at 4 points. Its non-conductivity enables it to be relatively large as to distribute the stresses over a larger area of the hub cover (spinner).

The entire mounting element 70C (console including cover) can be dismounted from outside the hub by removing the four hub bolts and an additional bolt providing connection of the lightning current transfer profile 75-2 with the connection bus 75-3. Fibre glass profile 70C is provided with a pretension so that the contact element 70B-1 is pressed against the blade band 10A so as to ensure controlled lightning current transfer between the pitching blade and the lightning ring 80, i.e. a controlled high conductivity connection at least for very high voltages of more than 10,000 Volts.

In conclusion, this invention has been made in order to provide a lightning current transfer system for larger wind turbines in which parts of well-known technology can be reused, wherein the lightning wear of the parts is reduced and all parts are exchangeable in-situ.

The invention claimed is:

1. A lightning current transfer system adapted for usage in a wind turbine having a hub rotatably supported relative to a generator in a nacelle and a plurality of blades pivotably connected with the hub, wherein the hub is covered by a spinner, said system comprising:
    a blade band mountable to the root of the blade;
    a lightning ring mountable to the spinner facing the nacelle;
    a first contact device mountable to the spinner adapted for providing lightning current transfer from the blade band;
    a connecting device for connecting the first contact device with the lightning ring; and
    a second contact device mountable to the nacelle and adapted for providing lightning current transfer from the lightning ring.

2. The lightning current transfer system according to claim 1, wherein the lightning current transfer system is usable for a wind turbine (W) wherein the hub has a radial extension so that the blade band rotates outside a perimeter of the nacelle.

3. The lightning current transfer system according to claim 1, wherein:
    the blade band and the first contact device are configured to be mounted outside the spinner; and
    the connecting device is configured to be mounted inside the spinner.

4. The lightning current transfer system according to claim 1, wherein the first contact device comprises:
    a first mounting element mountable to the spinner;
    a first elastic non-conducting profile mounted to the first mounting element; and
    a first contact element mounted at the first elastic non-conducting profile;
    wherein the first contact device is configured so that the first contact element faces the blade band and the first elastic non-conducting profile pushes the first contact element against the blade band.

5. The lightning current transfer system according to claim 4, wherein the first contact element comprises:
    a conductive rod; and
    a sliding element,
    wherein the conductive rod extends through a hole of the sliding element so that an end surface of the conductive rod and a surface of the sliding element collectively form a contact area for slidingly contacting the blade band.

6. The lightning current transfer system according to claim 5, wherein the sliding element has a chamfered edge.

7. The lightning current transfer system according to claim 5, wherein the sliding element is made of polycaprolactam.

8. The lightning current transfer system according to claim 4, wherein the first elastic non-conducting profile has the same structure as the second elastic non-conducting profile so that these elements are interchangeable.

9. The lightning current transfer system according to claim 8, wherein the first contact element has the same structure as the second contact element so that these elements are interchangeable.

10. The lightning current transfer system according to claim 4, wherein the first mounting element comprises:
   a fibre glass console acting as a fastening bracket for the first elastic non-conducting profile; and
   a cover for protecting the first contact element.

11. The lightning current transfer system according to claim 4, wherein the first elastic non-conducting profile and/or the second elastic non-conducting profile is a fibre glass profile.

12. The wind turbine according to claim 11, wherein the nacelle includes an inspection hatch for in situ inspecting the lightning ring.

13. The lightning current transfer system according to claim 1, wherein the second contact device comprises:
   a second mounting element mountable at one end to a front plate of the nacelle thereby protruding therefrom;
   a second elastic non-conducting profile mounted at one end to another end of the second mounting element;
   a second contact element mounted at the second elastic non-conducting profile,
   wherein the second contact device is configured so that the contact element faces the lightning ring and the second elastic non-conducting profile pushes the second contact element against the lightning ring.

14. The lightning current transfer system according to claim 13, wherein the second mounting element is a stainless steel bracket.

15. The lightning current transfer system according to claim 1 comprising at least two second contact devices.

16. A wind turbine comprising:
   a hub rotatably supported relative to a generator in a nacelle and a plurality of blades pivotably connected with the hub, wherein the hub is covered by a spinner (20A); and
   a lightning current transfer system according to claim 1, wherein
   the blade band is mounted to the root of the blade;
   the lightning ring is mounted to the spinner facing the nacelle;
   the first contact device is mounted to the spinner for providing lightning current transfer from the blade band; and
   the second contact device is mounted to the nacelle for providing lightning current transfer from the lightning ring.

17. The wind turbine according to claim 16, wherein the hub has a radial extension so that the blade band rotates outside a perimeter of the nacelle.

18. The lightning current transfer system according to claim 16, wherein:
   the blade band and the first contact device are mounted outside the spinner; and
   the connecting device is mounted inside the spinner.

* * * * *